United States Patent [19]

Smith et al.

[11] Patent Number: 4,682,222
[45] Date of Patent: Jul. 21, 1987

[54] STIMULATED SCANNING INFRARED IMAGING SYSTEM

[75] Inventors: Daniel P. Smith, Ballston Spa; Robert D. Lillquist, Schenectady, both of N.Y.

[73] Assignee: General Electric Company, Schenectady, N.Y.

[21] Appl. No.: 804,725

[22] Filed: Dec. 5, 1985

[51] Int. Cl.$^4$ .............................................. H04N 5/33
[52] U.S. Cl. ..................................... 358/113; 250/334
[58] Field of Search ......................... 358/113; 250/334

[56] References Cited

U.S. PATENT DOCUMENTS

| | | | |
|---|---|---|---|
| 1,781,799 | 11/1930 | Baird | 358/113 |
| 3,953,667 | 4/1976 | Layton | 358/113 |
| 4,260,888 | 4/1981 | Holly | 358/113 |
| 4,298,280 | 11/1981 | Harney | 358/113 |

OTHER PUBLICATIONS

McGraw-Hill Encyclopedia of Science & Technology, 5th Edition, vol. 12, pp. 78-80, "Scanning Electron Microscope".

*Primary Examiner*—Howard W. Britton
*Attorney, Agent, or Firm*—William H. Steinberg; James C. Davis, Jr.; Paul R. Webb, II

[57] ABSTRACT

A scanning infrared display system capable of variable magnification and high spatial resolution measures the emitted infrared radiation caused by the scanning of a highly collimated energy source beam on the surface to be imaged. The resulting infrared emissions are collected with a high sensivity stationary detector. The display image is formed on a CRT by scanning the object with a raster pattern in synchronization with the CRT and modulating the Z axis CRT potential (brightness) with the infrared detection signal.

2 Claims, 1 Drawing Figure

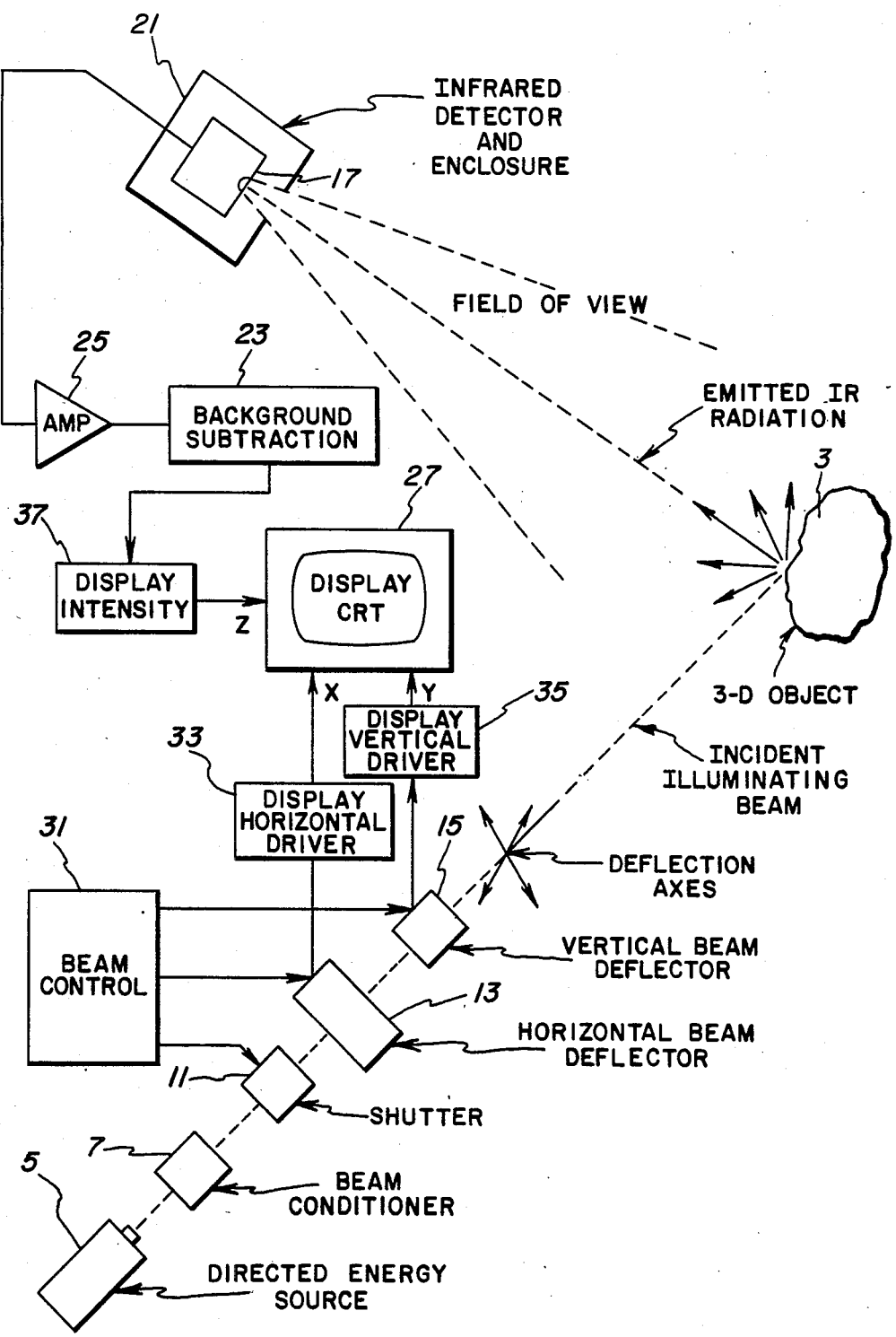

STIMULATED SCANNING INFRARED IMAGING SYSTEM

BACKGROUND OF THE INVENTION

The present invention relates to remote sensing and more particularly to a scanning infrared display system.

When electromangnetic energy interacts with the surface of a body, the interaction depends not only on the surface properties but also depends on the bulk material beneath the surface. The interaction can produce a number of changes in the incident electromagnetic radiation, changing the magnitude, direction, wavelength, polarization and phase. By examining the changes in the electromagnetic energy the characteristics of the matter that produced the changes can be identified. The interactions which provide the basis for remote sensing are the extent to which incident radiation is transmitted, reflected, absorbed, emitted or scattered.

Conventional scanning infrared systems image the infrared energy being emitted from a body as a result of its temperature, using very expensive infrared transmissive lenses, to form an image at the vertical focal plane. This image is then scanned mechanically with a single detector system. In order to resolve areas of nonuniform material (a defect for instance) a steady state temperature difference must be induced on the surface of the object.

It is an object of the present invention to provide a system for performing precision scanning of short wavelength electromagnetic beams or charged particles without the need for expensive infrared optics.

It is a further object of the present invention to provide a scanning infrared detection system providing variable magnification and long range, non-contact sensing ability of an infrared image without the necessity of expensive infrared optics.

BRIEF DESCRIPTION OF THE DRAWING

While the specification concludes with claims particularly pointing and distinctly claiming the present invention, objects and advantages of the invention can be more readily ascertained from the following description of the preferred embodiment when used in conjunction with the accompanying drawing in which the FIG. shows a block diagram representation of a stimulated scanning infrared imaging system in accordance with the present invention.

SUMMARY OF THE INVENTION

In one aspect of the present invention a stimulated scanning infrared imaging system for scanning object surfaces is provided. The imaging system comprises a directed energy source for providing a collimated illuminating beam. The illuminating beam movement over the surface of the object to be imaged is controlled by an illuminating beam deflector. An infrared detection means provides a signal proportional to the intensity of the infrared radiation from the object scanned by said directed energy source. Image recording means including means for recording image intensity coupled to the infrared detection means and means for controlling the position at which the image intensity is recorded. Beam control means is coupled to the illuminating beam deflector means for controlling the position at which the image intensity is recorded, for synchronously driving the illuminating beam and the means for controlling the position at which said image intensity is recorded, to provide an infrared image of the surface scanned.

DETAILED DESCRIPTION OF THE INVENTION

Referring now to the drawing, a stimulated scanning infrared imaging system comprising three basic components is shown. The three basic components are a scanning energy source, an infrared detector system and an image display system.

The scanning energy source provides an incident illuminating beam on the object 3 to be examined. The scanning energy source comprises a directed energy source 5 capable of ultimately producing a small, stable, highly collimated beam which can be redirected by electrical or mechanical means. Laser, or particle beam (e.g. electron) guns are suitable sources. In a preferred embodiment suitable for detecting surface or near-surface features in metallic objects, the excitation source would preferably use optical radiation in the visible or near-infrared wavelength (approximately 400–1000 nanometers) since virtually all metallic conductors absorb most efficiently in this spectral region. A suitable source is an argon laser running at any of its principal wavelengths (476.5, 488.0 or 514.5 nanometers) in the continuous wave mode at a power level of 1 watt or greater.

The scanning energy source also comprises a beam conditioner 7 for beam mode selection and collimation. A spatial filter provides the necessary beam conditioning since the output of an argon laser is already well collimated. A shutter 11 may be optionally required to pulse the beam to minimize thermal blooming when highly conductive objects are targeted. Standard mechanical (e.g. choppers) or electro-optic (e.g. "Q" switches) devices are suitable for most sources.

Beam scanning action is accomplished by a pair of othogonal beam deflectors 13 and 15 which in the present embodiment comprise a pair of anti-reflection coated rotating prisms. Alternatively, acousto-optical deflectors may be used for a laser source. If a particle beam source were used, magnetic or electrostatic deflectors would be suitable.

Infrared detection in the preferred embodiment is performed by a lead sulfide photoconductive detector 17 which provides adequate sensitivity at room temperature to mid-infrared radiation while being insensitive to the excitation source wavelengths. Alternatively, a lead selenide photoconductive detector could be used. While, virtually any thermal or photon infrared detector would be suitable, improvement in sensitivity can be achieved by employing cryongenically-cooled infrared detection, such as indium antimonide or mercury cadmium telluride. The detector enclosure 21 includes the detector cooling system (if required) and sets the detector's limiting aperture, which should, at a minimum, provide a field of view that fully encloses the scanned region of the object 3. Background radiation (ambient temperature) signal subtraction is accomplished in block 23 by introducing an offset voltage or current as appropriate into the detector's output signal which has been amplified by amplifier 25.

The image display system comprises a cathode ray tube 27 with separate X, Y and Z inputs and when color systems are used separate control of the red, green and blue electron guns. A beam control 31 drives the illuminating beam horizontal and vertical deflectors 13 and 15, respectively, and also positions the electron beam in the CRT display (X and Y inputs) by coupling the signal sent to the illuminating beam horizontal deflector 13 to display horizontal driver 33 of the display CRT 27 and coupling the signal sent to the illuminating vertical beam deflector 15 to display vertical driver 35 of the display CRT 27. The detector signal is coupled to a display intensity driver 37 which controls the display beam intensity (Z input). Band pass filters may be used in front of the infrared detector 17 to restrict the range of infrared wavelengths detected. While a single detector is shown, multiple detection with suitable filters may be used with a color cathode ray tube display, to give a combined display of hue as a measure of wavelength and saturation as a measure of intensity of the emitted radiation or vice versa. A single detector with multiple filters and means of synchronizing the filter with the correct color signal to a color display could alternatively be used.

In operation the highly collimated beam from the argon ion laser is scanned in a regular raster pattern across the surface of the object 3 to be imaged. Energy flux requirements are a function of detection sensitivity and scanning rate as well as object absorptivity and thermal conductivity. Signals from the beam control 31 controls the horizontal beam deflector 13 and vertical beam deflector 15, each comprising rotating prisms. The emitted infrared radiation emissions caused by the highly collimated laser, is detected by the stationary detector 17. A display image is formed on the cathode ray tube 27 by scanning the object with a raster pattern in synchronization with the raster pattern of the cathode ray tube and modulating the Z axis CRT position (brightness) with the infrared detector signal. Variable magnification is provided by the ratio of the size of the laser beam raster to the size of the CRT raster. This technique should be applicable from microscopic inspection sizes (1 cm×2 cm sample) to large manufacturing sizes 1 m×1 m or larger. Image resolution is controlled by the illuminating beam's characteristics rather than the detection wavelength, resulting in much higher resolution and depth of field then conventional medium and infrared focal-plane imaging systems.

The present invention relies on transient heating of the surface to be evaluated, with a moving energy source rather than sensing the infrared energy being emitted from an object as a result of its temperature, and therefore, is much better suited for detecting and locating surface or near-surface cracks in metallic objects. The present invention is also suitable for locating bonding flaws in laminated structures such as electronic components and circuits using a neodymium doped yttrium-aluminum-garnet crystal laser, for example, as the scanning energy source.

The foregoing describes a stimulated scanning infrared imaging system that accomplishes precision scanning of short wavelength electromagnetic beams, or charged particles with standard relatively inexpensive components eliminating the need for elaborate infrared optics.

What is claimed is:

1. A stimulated scanning infrared imaging system for scanning object surfaces comprising:
   a directed energy source for providing a collimated illuminating beam;
   illuminating beam deflection means for controlling illuminating beam movement over the surface of the object to be imaged;
   infrared detection means for providing a signal proportional to the intensity of the infrared radiation from the object scanned by said directed energy source;
   image recording means including means for recording image intensity coupled to said infrared detection means and means for controlling the position at which said image intensity is recorded; and
   beam control means coupled to said illuminating beam deflector means and said means for controlling the position at which said image intensity is recorded, for synchronously driving said illuminating beam and said means for controlling the position at which said image intensity sis recorded, to provide an infrared image of the surface scanned, the ratio of said illuminating beam movement to the synchronized control of the position at which said image is recorded, controlling image magnification.

2. The system of claim 1 wherein said imaging display means comprises a cathode ray tube display means and said means for controlling image intensity comprises the electron beam in the cathode ray tube display means.

* * * * *